UNITED STATES PATENT OFFICE.

SOMA GELLÉRI, OF BUDAPEST, AUSTRIA-HUNGARY, ASSIGNOR OF ONE-HALF TO ANTON HAMBLOCH, OF ANDERNACH, GERMANY.

METHOD OF RECOVERING ALKALIS FROM SILICATES.

1,078,496.  Specification of Letters Patent.  Patented Nov. 11, 1913.

No Drawing. Original application filed January 3, 1912, Serial No. 669,278. Divided and this application filed January 20, 1913. Serial No. 743,158.

*To all whom it may concern:*

Be it known that I, SOMA GELLÉRI, a subject of the Emperor of Austria-Hungary, residing in Budapest, Austria-Hungary, and whose post-office address is Budapest, I, Budafoki ut 22, have invented a certain new and useful Method of Recovering Alkalis from Silicates, of which the following is a specification.

This invention which is a division from the co-pending application Serial No. 669278, relates to a method of recovering alkalis from silicates. In said application it is proposed to treat a mixture of alkaline earth metal oxid or carbonate and an alkaline silicate heated with a sulfate with ammonium carbonate vapors under pressure, in order to recover alkaline sulfates from silicates. The ammonium carbonate, on the one hand, decomposes the mixture of compounds formed on burning and enables the whole content of alkali in the silicate to be separated in the form of alkali sulfate and on the other hand the excess free lime, the lime in the calcium sulfate, and also the silicic acid and the aluminium oxid are precipitated in insoluble form and so it is possible to obtain the alkali sulfate in a chemically pure state.

As an alternative method the ammonium carbonate vapors under pressure may be replaced by carbon dioxid under pressure. The compound mass is thrown into water and heated and then the carbon dioxid is run in. The carbon dioxid decomposes the complex silicates formed by the heating in such a manner that they convert the alkalis in the silicates into carbonates, which then react with the sulfate that is present and are converted into alkali sulfates. The carbonic acid, like the ammonium carbonate, has a second task, that of precipitating the excess of free lime in the form of calcium carbonate and the silicic acid and the aluminium in insoluble form, so that on separating the alkali sulfate only the excess of calcium sulfate present enters the solution and this can be separated from the alkali sulfates by fractional crystallization.

The carbon dioxid necessary for this process is preferably and advantageously taken from the furnaces used for heating the silicate-limestone mixture, or the carbon dioxid which escapes from the lime stone heated with the silicates may be used.

After recovering the alkali from the silicate, preliminarily treated with lime and sulfate, the residue is formed into Portland cement by burning.

Having now described the nature of my said invention and the best means I know of carrying the same into practical effect, I claim:—

1. A process of recovering alkalis from silicates consisting in heating the silicate rocks with lime and a sulfate, in treating the heated mass with carbon dioxid under high pressure and in separating the constituents of the treated mass.

2. A process of recovering alkalis from silicate rocks consisting in heating the silicates with lime-stone and a sulfate, in treating the heated mass with carbon dioxid under high pressure and in separating the constituents of the treated mass.

In testimony whereof I have signed my name to this specification in the presence of two subscribing witnesses.

SOMA GELLÉRI.

Witnesses:
  E. H. KELEMEN,
  JOHN J. PONTO.

Copies of this patent may be obtained for five cents each, by addressing the "Commissioner of Patents, Washington, D. C."